(12) United States Patent
Durand et al.

(10) Patent No.: US 11,440,144 B2
(45) Date of Patent: Sep. 13, 2022

(54) RETAINING DEVICE FOR DISASSEMBLING A BLADED WHEEL OF A TURBINE ENGINE AND METHOD EMPLOYING IT

(71) Applicant: SAFRAN AIRCRAFT ENGINES, Paris (FR)

(72) Inventors: Yannick Durand, Moissy-Cramayel (FR); Nicolas Daniel Delaporte, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 245 days.

(21) Appl. No.: 16/711,644

(22) Filed: Dec. 12, 2019

(65) Prior Publication Data

US 2020/0189044 A1 Jun. 18, 2020

(30) Foreign Application Priority Data

Dec. 12, 2018 (FR) ...................................... 1872766

(51) Int. Cl.
*B23P 6/00* (2006.01)
*F01D 25/28* (2006.01)

(52) U.S. Cl.
CPC ............ *B23P 6/005* (2013.01); *F01D 25/285* (2013.01); *F05D 2220/30* (2013.01); *F05D 2230/70* (2013.01)

(58) Field of Classification Search
CPC ...... B23P 6/005; B23P 19/006; F01D 25/285; F01D 5/3015; F01D 5/005; F05D 2220/30; F05D 2260/38; F05D 2230/70; F05D 2230/80
See application file for complete search history.

(56) References Cited

U.S. PATENT DOCUMENTS

| | | | |
|---|---|---|---|
| 8,046,886 B2 * | 11/2011 | DeMania | F01D 5/3007 29/889.21 |
| 2005/0175463 A1 | 8/2005 | Giot et al. | |
| 2008/0173062 A1 | 7/2008 | Brucher et al. | |
| 2009/0183349 A1 | 7/2009 | Walsh et al. | |
| 2014/0205463 A1 | 7/2014 | Herraiz et al. | |
| 2014/0356173 A1 | 12/2014 | Evain et al. | |
| 2017/0145841 A1 | 5/2017 | Congratel et al. | |
| 2018/0163549 A1 * | 6/2018 | Kolvick | F01D 5/3015 |

FOREIGN PATENT DOCUMENTS

| | | |
|---|---|---|
| EP | 3336315 A1 | 6/2018 |
| FR | 2972759 A1 | 9/2012 |
| GB | 2 438 385 A | 11/2007 |

OTHER PUBLICATIONS

French Preliminary Search Report for FR 1872766 dated Aug. 28, 2019.

* cited by examiner

*Primary Examiner* — Moshe Wilensky
(74) *Attorney, Agent, or Firm* — Sughrue Mion, PLLC (57) ABSTRACT

The invention relates to a retaining device for disassembling a bladed wheel of a turbine engine.
The invention is characterized in that the retaining device (100) includes:
 an inter-blade ring sector (101),
 a plurality of retaining clips (105), each retaining clip (105) cooperating with one of the damping elements (40), the retaining clips (105) extending radially while being attached circumferentially to the ring sector (101).

11 Claims, 7 Drawing Sheets

RETAINING DEVICE FOR DISASSEMBLING A BLADED WHEEL OF A TURBINE ENGINE AND METHOD EMPLOYING IT

The invention relates to a retaining device for disassembling a bladed wheel of a turbine engine.

One field of application of the invention relates to aircraft turbine engines.

In a bladed wheel of this type, the blades are retained in position thanks to a disk on which they are mounted and thanks to a retaining ring which blocks axially the movement of the blades at the blade roots.

The retaining ring necessitates periodical replacement due to its wear during operation of the turbine engine. It is therefore sought to propose a solution allowing easy replacement of the retaining ring on the turbine engine.

To disassemble the retaining ring, a selected solution is to dispose the turbine vertically, hence with the wheel placed around a vertical axis and the upstream side of the wheel turned upward.

One of the problems of this solution is to hold in place the damping elements during removal of the retaining ring to be changed, then during the mounting of a new retaining ring.

In fact, after removal of the old retaining ring and before the mounting of the new retaining ring, the damping elements are no longer held in position and strongly risk leaving their housing and even falling inside the turbine engine.

The invention seeks to propose a retaining device for disassembling a bladed wheel, as well as a disassembly method for the bladed wheel, which allow resolving this problem of retaining the damping elements in the absence of the retaining ring.

To this end, a first object of the invention is a retaining device for disassembling a wheel having blades of a turbine engine in order to remove a downstream retaining ring of the wheel when the wheel is disposed around a vertical axis with an upstream side of the wheel turned upward, the blades of the wheel extending radially and being intended to be mounted circumferentially around a disk of the wheel, the wheel including, for each blade, a damping element disposed in a cavity which opens radially inward and which is delimited by a platform of the blade and by an inner upstream wall of the blade terminating by an upstream groove, the downstream retaining ring being housed in a downstream groove of the platform of the blade, the upstream groove and the downstream groove extending radially, wherein the retaining device is intended to be mounted coaxially with a vertical axis and includes:

an inter-blade ring sector, a plurality of retaining clips, each retaining clip being intended to cooperate with one of the damping elements, the retaining clips extending radially while being attached circumferentially to the inter-blade ring sector.

Thanks to the invention, the device allows retaining in place the damping elements of each wheel during removal of the retaining ring to be changed, then during mounting of the new retaining ring, particularly when these operations are accomplished while the turbine engine is placed vertically, upstream side upward.

According to an embodiment of the invention, the inter-blade ring sector extends circumferentially and comprises a flank extending radially, the inter-blade ring sector being configured so that the flank can be inserted into a plurality of the upstream grooves being circumferentially adjacent.

According to an embodiment of the invention, the flank has a first contact zone configured to cooperate with the plurality of upstream grooves.

According to an embodiment of the invention, each retaining clip has a first end portion, which is free and which is configured to be able to be inserted respectively into a lateral recess of each damping element.

According to an embodiment of the invention, the first end portion has a second zone of contact with the damping element.

According to an embodiment of the invention, the first end portion is connected to a second end portion of the retaining clip, and the second end portion is attached to the flank.

According to an embodiment of the invention, the first end portion is thicker than the second end portion.

According to an embodiment of the invention, the second end portion and the flank delimit a slot allowing to mount the inter-blade ring sector in the upstream groove.

According to an embodiment of the invention, the retaining clips are prestressed upwardly relative to the inter-blade ring sector.

According to an embodiment of the invention, the plurality of retaining clips is distributed over a circumferential angular range which is greater than or equal to 10° and less than or equal to 30°.

A second object of the invention is a method for disassembling a wheel having blades of a turbine engine, comprising:

during a first step, disposing the wheel having blades around a vertical axis with an upstream side of the wheel turned upward, the blades of the wheel being mounted circumferentially around a disk of the wheel, the wheel including, for each blade, a damping element disposed in a cavity, which opens radially inward and which is delimited by a platform of the blade and by an inner upstream wall of the blade terminating by an upstream groove, the downstream retaining ring being housed in a downstream groove of the platform of the blade, the upstream groove and the downstream groove extending radially, during a second step after the first step, withdrawing the disk), during a third step after the second step, mounting a flank of the above-mentioned retaining device coaxially with the vertical axis in the plurality of upstream grooves being circumferentially adjacent and mounting the plurality of retaining clips of the retaining device against the plurality of the damping elements to retain the plurality of the damping elements, during a fourth step after the third step, withdrawing the downstream retaining ring, during a fifth step after the fourth step, mounting a new downstream retaining ring in the downstream groove, during a sixth step after the fifth step, replacing the disk against the new downstream retaining ring in the wheel having blades.

The invention will be better understood upon reading the description that follows, given solely by way of a non-limiting example with reference to the appended drawings, in which.

Figure 1:
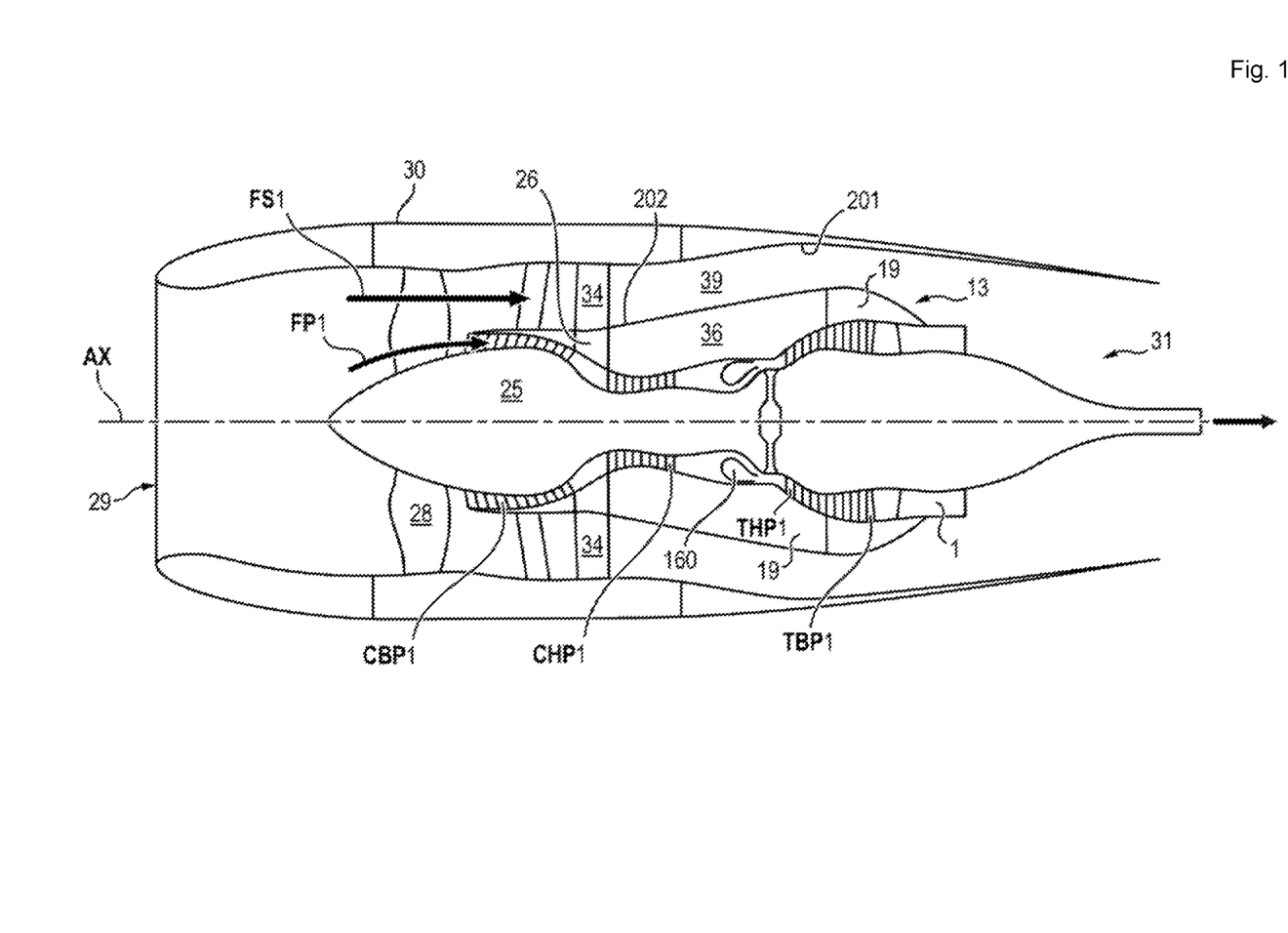
FIG. 1 shows schematically in axial section an example of a turbine engine.

As is known, the turbine engine 1 shown in FIG. 1 is intended to be installed in an aircraft, not shown, to propel it in the air. The gas turbine engine assembly or turbine engine 1 has a longitudinal axis AX, oriented from upstream to downstream. The direction running from the inside to the outside is the radial direction starting from the longitudinal axis AX. The term axially designates a direction following the longitudinal axis AX. The turbine engine is for example of the two bodies type. The turbine engine 1 comprises a fan assembly 28 and a central gas turbine engine 13. The central gas turbine engine 13 comprises, from upstream to downstream in the gas flow direction, a low-pressure compressor CBP1, a high-pressure compressor CHP1, a combustion chamber 160, a high-pressure turbine THP1 and a low-pressure turbine TBP1 which delimit a primary gas flow FP1. The fan assembly 28 comprises a set of fan blades extending radially outward from a rotor 25. The turbine engine 1 has an upstream inlet end 29 and a downstream exhaust end 31. The turbine engine 1 also comprises and inter-stream casing 36 which delimits a primary stream in which circulates the primary flow FP1 which passes through the high-pressure compressor CHP1, the high-pressure turbine THP1 and the low-pressure turbine TBP1. The inter-stream casing 36 includes an intermediate casing 26, which is present between the low-pressure compressor CBP1 and the high-pressure compressor CHP1. The high-pressure turbine THP1 is rigidly joined to the high-pressure compressor CHP1 so as to form a high-pressure body, while the low-pressure turbine TBP1 is rigidly joined to the low-pressure compressor CBP1 so as to form a low-pressure body, so that each turbine drives the associated compressor in rotation around the axis AX under the influence of the thrust of the gases originating from the combustion chamber 160.

In operation, air flows through the fan assembly 28 and a first portion FP1 (primary flow FP1) of the air flow is routed through the high-pressure compressor CHP1, in which the air flow is compressed, and sent to the combustion chamber 160. The hot combustion products (not shown in the figures) originating from the combustion chamber are used to drive the turbines THP1 and TBP1 and thus produce the thrust of the turbine engine 1. The turbine engine 10 also comprises a secondary stream 39 which is used to pass a secondary flow FS1 of the air flow exhausted from the fan assembly 28 around the inter-stream casing 36. More precisely, the secondary stream 39 extends between an inner wall 201 of a fan shroud 30 or nacelle 30 and the inter-stream casing 36 surrounding the central gas turbine engine 13. Arms 34 connect the intermediate casing 26 to the inner wall 201 of the shroud 30 in the secondary stream 39 of the secondary flow FS1.

Hereafter, the bladed wheel(s) 10 may for example be that/those of the low-pressure turbine TBP1. Of course, the bladed wheel(s) may belong to portions of the turbine engine 1 other than the low-pressure turbine TBP1.

Figure 2:
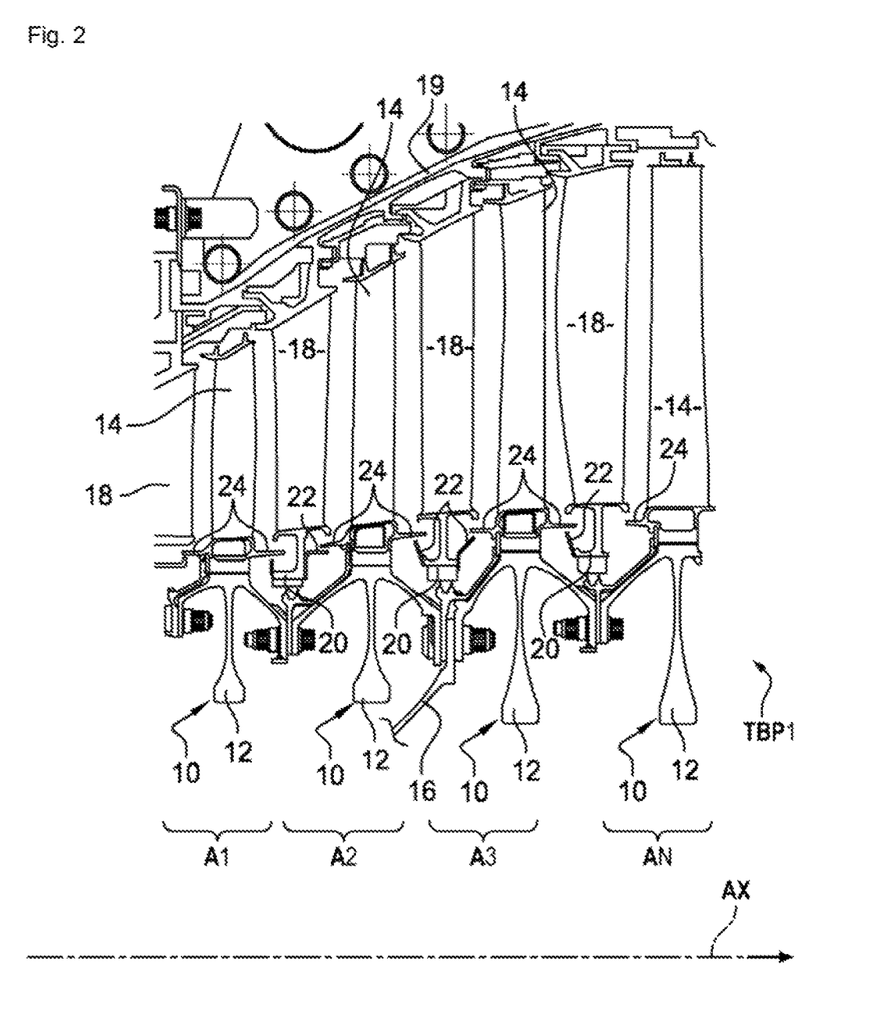
FIG. 2 shows schematically in partial axial section an example of a low-pressure turbine of the turbine engine of FIG. 1.
Figure 3:
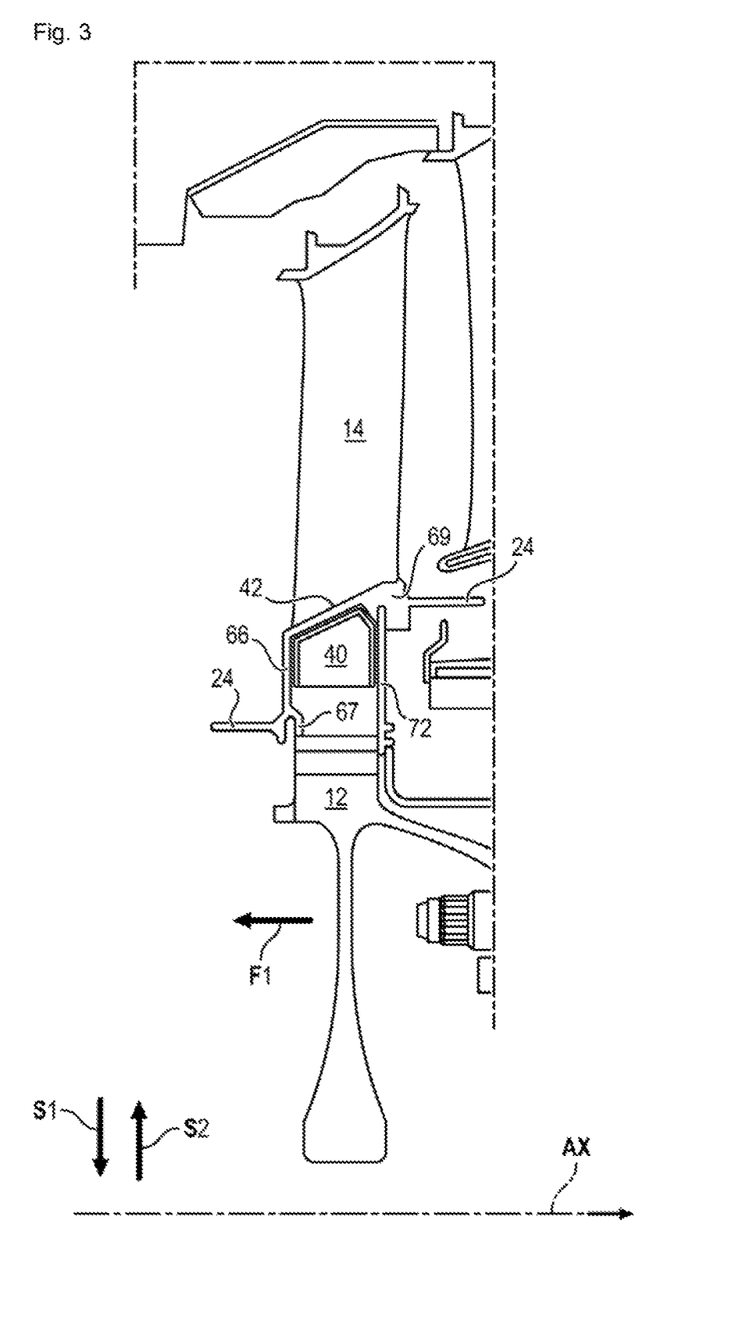
FIG. 3 shows schematically in partial axial section an example of a bladed wheel of the low-pressure turbine of FIG. 2.

In FIGS. 2 and 3, the rotor of the low-pressure turbine TBP1 comprises several (N) successive stages A1, A2, A3, . . . AN from upstream to downstream. The N stages A1, A2, A3, . . . AN include respectively N wheels 10 assembled axially to one another by annular flanges and each including a disk 12 carrying individual blades 14, disposed circumferentially around the disk 12 and extending radially. Each stage A1, A2, A3, . . . AN includes a distributor formed from an annular row of fixed blades 18 and a wheel 10 having blades 14, which is mounted in rotation around the longitudinal axis AX and is generally found downstream of the distributor. These blades 14 each comprise an airfoil connected by a platform 42 to a root, which is for example shaped like a dovetail or the like, and which is engaged in a longitudinal slot formed in the outer periphery of the disk 12. The slots which house the blade roots together define between them teeth which are surrounded by the blade platforms 42. The rotor is connected to the turbine shaft by means of a drive cone 16. Between the wheels 10 are located annular rows of fixed blades 18 which are mounted by appropriate means at their radially outer ends on a casing 19 of the low-pressure turbine TBP1, attached to the inter-stream casing 36. The fixed blades 18 of each row are united one to another at their radially inner ends by annular sectors 20 placed circumferentially end to end. Spoilers or circumferential edges 22, upstream and downstream, are formed in axial protrusion on the annular sectors 20, and constitute chicanes with other spoilers of circumferential edges 24, upstream and downstream, of the platforms 42 of the blades 14, to limit the passage of combustion gases, originating from the combustion chamber 160 upstream of the turbine TBP1, radially from the outside to the inside.

In each wheel 10, the blades 14 are retained in position thanks to the disk 12, in which they are inserted, and are blocked along the longitudinal axis AX by a retaining ring 72. The wheel 10 includes, for each blade 14, a damping element 40 disposed in a cavity 45. In each blade 14, at its root, the damping members 40 have the principal function of reducing vibration modes of the blades 14 during operation of the turbine engine 1. The damping elements 40 are mounted in lateral cavities 45 of the blades 14, also called housings 45, situated facing the platforms 42 of the blades 14. These damping elements 40 may also serve as sealing members. These damping elements 40 mold themselves with little clearance to the inner shape of the cavities 45. Each lateral cavity 45 opens radially inward, i.e. each lateral cavity 45 has an opening turned in a first predetermined direction S1, which is the centripetal direction oriented toward the longitudinal axis AX. Each lateral cavity 45 is delimited by the platform 42, by an inner upstream wall 66 connected to the platform 42 and by an inner downstream wall 68 connected to the platform 42 and situated at a distance from the inner upstream wall 66. The inner upstream wall 66 terminates in the first direction S1 by an upstream groove 67 extending radially and open in the first direction S1. The inner downstream wall 68 forms or includes a downstream groove 69 extending radially and open in the first direction S1. The downstream retaining ring 72 is inserted by its outer edge into the downstream groove 69. In operation, the damping elements 40 are subjected to centrifugal forces and are pressed radially against the platforms 42, thus preventing the radial passage of hot gases from the stream at the support zones.

The method for disassembling the downstream retaining ring 72 is the following, according to one embodiment of the invention. This disassembly is carried out to replace the downstream retaining ring 72 in the turbine engine 1, when this downstream retaining ring 72 is worn.

Figure 6:
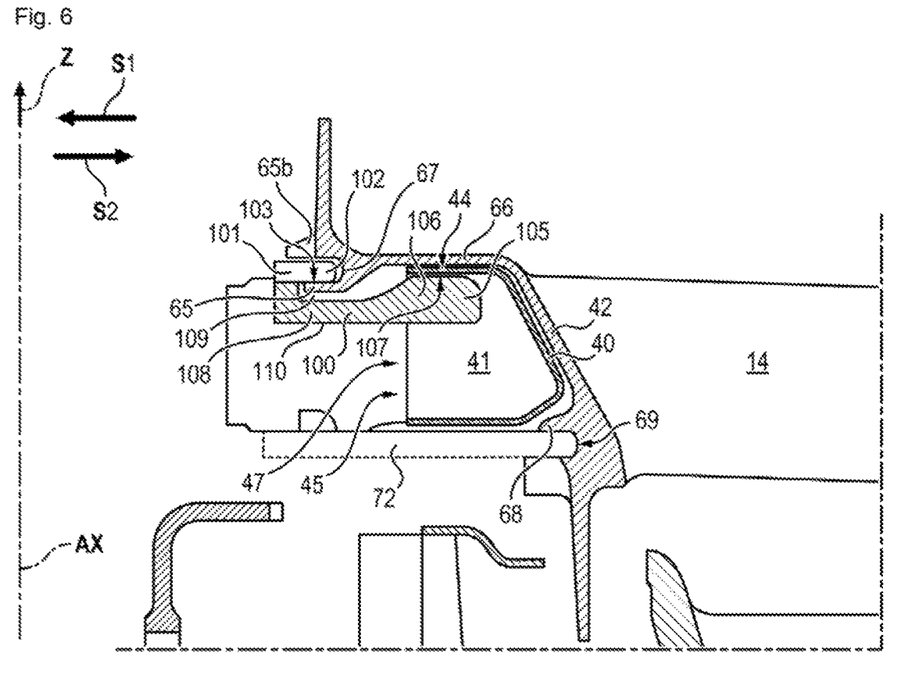
FIG. 6 shows schematically in axial section the retaining device of FIGS. 4 and 5 mounted in a bladed wheel of FIG. 3, according to one embodiment of the invention.
Figure 7:
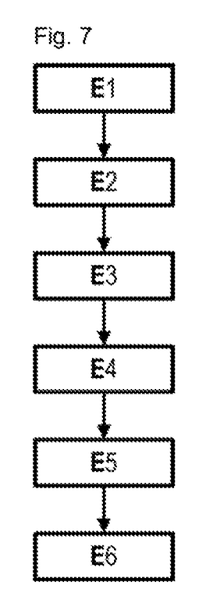
FIG. 7 shows a flowchart of a method for disassembling the bladed wheel of FIG. 3, using the retaining device of FIGS. 4 and 5, according to one embodiment of the invention.

To disassemble the downstream retaining ring 72 and change it, the turbine engine is disposed to have the wheel 10 horizontal, i.e. with the longitudinal axis AX oriented verticality downward, and therefore with the upstream side upward and the downstream side downward, the wheel 10 having blades 14 then being disposed around the rising vertical axis Z, oriented in the reverse direction of the axis AX, as shown in FIG. 6, during a first step E1 shown in FIG. 7.

Then, during a second step, the disk 12 is withdrawn by moving it upstream relative to the turbine engine 1, as shown by the thick arrow F1 in FIG. 3, i.e. upward.

The radial width of the wheels 10, of the platforms 42, of the downstream retaining rings 72 and of the disks 12 is increasing from one stage to the next, from upstream to downstream. Thus, according to one embodiment, to disassemble the disk 12 of a certain stage, the disk 12 of the stage(s) situated upstream relative to this certain stage is first disassembled.

Then, during a third step E3 following the second step E2, the retaining device 100 according to the invention is inserted into the housing 45 to retain the damping elements 40 of the bladed 14 wheel 10 in their initial assembly position. The retaining device 100 is placed in the geometry in the form of a hook (upstream groove 67) upstream of the movable blades 14 (axial stop) and presses the damping elements 40 upstream of the inter-blade cavity 45 which serves as their housing. The retaining device 100 may be provided in the form of a removable tool set.

Figure 4:
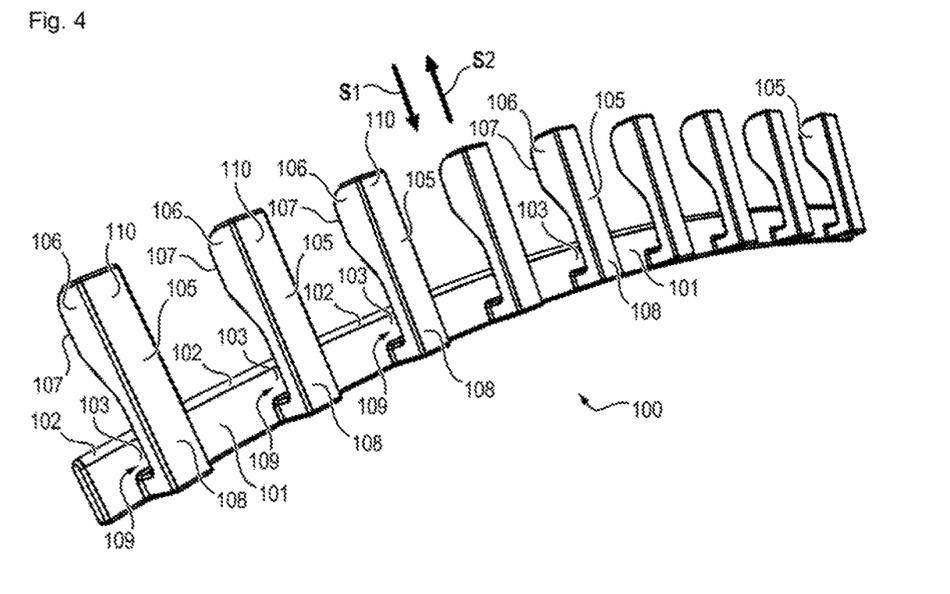
FIG. 4 shows schematically in a perspective view a retaining device according to one embodiment of the invention.
Figure 5:
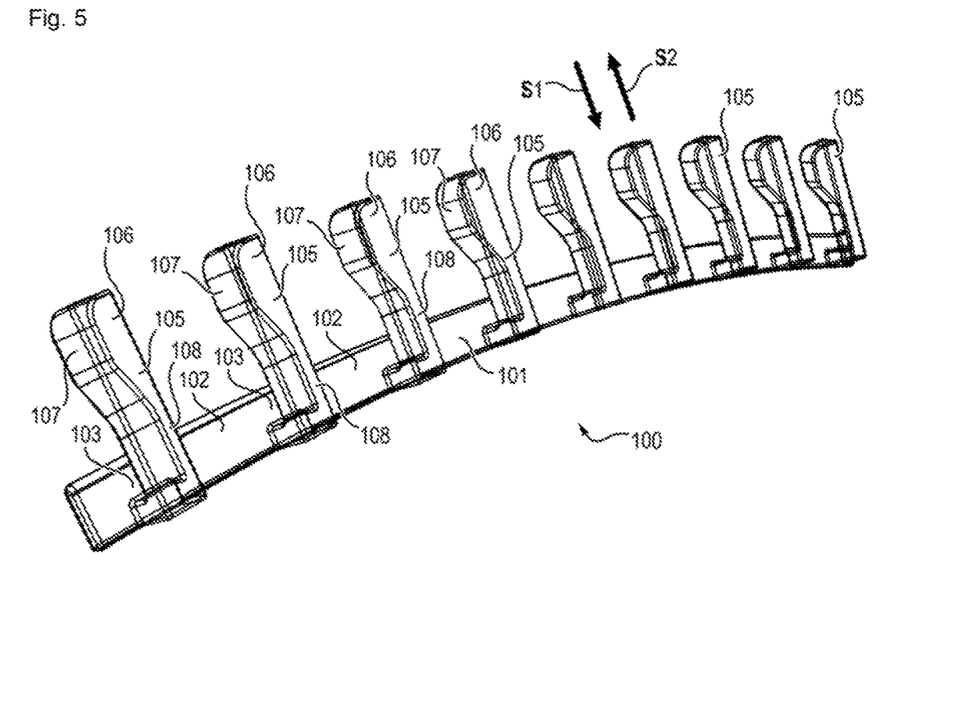
FIG. 5 shows schematically in perspective view a retaining device according to the embodiment of the invention of FIG. 4.

This retaining device 100 is described below, with reference to FIGS. 4, 5 and 6.

The retaining device 100 includes an inter-blade ring sector 101 extending circumferentially, and having for example a partially circumferential span, i.e. extending over only a portion of the circumference of the blades 14. This ring sector 101 has a flank 102 extending radially. The flank 102 has or forms a free outer edge, i.e. turned in a second direction S2 (centrifugal relative to the axis AX) opposite to the first determined direction S1. The ring sector 101 is configured so that the flank 102 can be inserted into a plurality of circumferentially adjacent upstream grooves 67, representing a portion of all the upstream grooves 67 of the wheel 10. The inter-blade ring sector 101 has for example an axial cross section (in a section plane containing the axial direction AX in FIG. 6) which is oblong and in particular rectilinear. The ring sector 101 is for example shaped as a circular arc.

Below the ring sector 101, a plurality of individual lateral retaining clips 105 is attached, to retain respectively a plurality of the damping elements 40. The flank 102 is axially facing the retaining clips 105. The flank 102 is for example axially facing a portion 108 which will be described below. The lateral clips 105 form tabs protruding radially outward below the ring sector 101, i.e. in the second direction S2. The lateral clips 105 are spaced from one another in the same manner as the spacing between the walls 66 of the adjacent blades 14. The plurality of lateral clips 105 of each retaining device is distributed over a circumferential angular range which is greater than or equal to 10° and less than or equal to 30°, and particularly greater than or equal to 15° and less than or equal to 25°. Thus a sufficiently large number (which may for example run up to 9 or 10) of damping elements 40 is retained in place by a single retaining device 100, while still ensuring that this retaining device 100 can be assembled and disassembled on the wheel 10. According to one non-limiting example, the plurality of lateral clips 105 of each retaining device is distributed over a circumferential angular range of approximately 20°.

Thus, during the third step E3, the flank 102 is inserted into the plurality of the circumferentially adjacent upstream grooves 67 and the plurality of lateral retaining clips 105 is inserted against the plurality of damping elements 40 to retain them in their assembly position in their housing 45 in the wheel 10. The retaining clips 105 and the ring sector 101 are made of a sufficiently rigid material so that they do not deform under the weight of the damping elements 40. Thus several retaining devices 100 are for example inserted circumferentially one after the other to retain in the assembly position all the damping elements 40 in the wheel 10.

Then, during a fourth step E4, the downstream retaining ring 72 (the old retaining ring 72) is withdrawn, namely from upstream relative to the turbine engine 1, i.e. by moving the downstream retaining ring 72 upward.

Then, during a fifth step E5, a new downstream retaining ring 72 is inserted into the downstream groove 69. Thus the initial downstream retaining ring 72, which is worn, is replaced by this new downstream retaining ring 72.

Then, during a sixth step E6, the disk 12 is disposed again against the new downstream retaining ring 72 in the bladed 14 wheel 10.

The method according to the invention thus allows withdrawing the downstream retaining ring 72 without disassembling the rest of the turbine TBP1. The invention thus allows first withdrawing the downstream retaining ring 72 of the first stage A1 situated further upstream without having to disassemble the other stages A2, A3, . . . , AN. Thus unstacking the different stages AN, . . . , A3, A2, A1 in that order from downstream to upstream (from the radially largest to the radially smallest) is avoided, which saves disassembly costs and disassembly time. The retaining device 100 according to the invention allows retaining in place the damping element 40 in the absence of the downstream retaining ring 72, when the turbine engine is in the vertical position described above and despite the fact that the available space is very restrained and confined. The retaining device 100 thus makes it possible to prevent the damping elements 40 from falling and snagging on other blades 14 and 18.

Of course, other steps may be provided for before, after or between the steps E1 to E6 described above. After step E6, the retaining device(s) 100 is/are then removed from the wheel 10.

According to one embodiment of the invention, the flank 102 has a first contact zone 103 configured to cooperate with the plurality of upstream grooves 67. Referring to FIG. 6, the first contact zone 103 is a first lower or downstream contact zone 103 to be in contact on a lower or downstream portion 65 of the plurality of blades 14, this lower portion 65 delimiting the plurality of the upstream grooves 67. This lower portion 65 is a first inner downstream rim, which is connected to the inner downstream wall 66 and is situated downstream of and facing a first inner upstream rim 65b, this first inner downstream rim 65 and this first inner upstream rim 65b delimiting the upstream groove 67. Thus a firm support of the retaining device against the blade 14 is ensured.

According to one embodiment of the invention, each retaining clip 105 has a first end portion 106, which is free and is configured to be able to be inserted respectively into a lateral recess 41 of each damping element 40. Each damping element 40 has a lateral recess 41 which opens radially inward, i.e. turned in the first direction S1. This lateral recess 41 is for example delimited upward, i.e. upstream, by a portion 44 of the damping element 40. In this case, for example, the first end portion 106 has a second zone 107 of contact with the damping element 40. The second contact zone 107 is for example a second upper or upstream contact zone 107, which is put into contact with the damping element 40, namely downstream or under the portion 44 of the damping element 40. The retaining device 100 thus provides a lifting force for the damping element 40.

According to one embodiment of the invention, the retaining clips 105 are assembled with an upward or upstream preload relative to the ring sector 101. The retaining device 100 thus provides a force retaining the ring sector 101 against the portion 65 (downward), conjugated with a force retaining the clip 105 axially below the portion 44 of the damping element 40 in the opposite direction (upward), which reinforces both the pressure of the damping elements 40 in the housing 45 against the platform 66 and the immobilization of the retaining device 100 on the wheel 10. For example, the retaining clips 105 and the ring sector 101 may be in single piece. For example, the retaining clips 105 and the ring sector 101 may be made of synthetic material, having a certain elasticity to force the retaining clips 105 upward relative to the ring sector 101 and to allow assembly of the retaining device 100 on the wheel 1.

According to one embodiment of the invention, the first end portion 106 is connected to the second end portion 108 of the retaining clip 105. This second end portion 108 is attached under the ring sector 101 and thus to the flank 102. The second end portion 108 is situated in the first direction S1 relative to the first end portion 106. For example, the first end portion 106 is thicker than the second end portion 108 in the direction of the longitudinal axis AX running top to bottom. Each retaining clip 105 has for example an oblong shape in the second direction S2 and thickens for example from the second end portion 108 to the first end portion 106. The first end portion 106 has for example a constant thickness below the second upper or upstream contact zone 107. The retaining clip 105 may have a flat back 110 on its lower or downstream surface.

According to one embodiment of the invention, the second end portion 108 and the ring sector 101 delimit a slot 109 for passage of the lower or downstream portion 65 of a blade 14.

Of course, the embodiments, features, possibilities and examples above may be combined together or be selected independently of one another.

The invention claimed is:

1. A retaining device for disassembling a wheel having blades of a turbine engine in order to remove a downstream retaining ring of the wheel when the wheel is disposed around a vertical axis with an upstream side of the wheel turned upward, the blades of the wheel extending radially and being intended to be mounted circumferentially around a disk of the wheel, the wheel comprising, for each blade, a damper disposed in a cavity which opens radially inward and which is delimited by a platform of the blade and by an inner upstream wall of the blade terminating by an upstream groove, the downstream retaining ring being housed in a downstream groove of the platform of the blade, the upstream groove and the downstream groove extending radially, wherein the retaining device is intended to be mounted coaxially with a vertical axis and comprises:

an inter-blade ring sector extending circumferentially and comprising a flank extending radially, and a plurality of individual lateral retaining clips, which have a prescribed spacing from one another and which are attached axially downstream of the inter-blade ring sector, wherein the individual lateral retaining clips form tabs protruding radially outward axially downstream of the inter-blade ring sector, wherein the flank is axially facing the individual lateral retaining clips, wherein the inter-blade ring sector is configured so that the flank is can be inserted into a plurality of upstream grooves being circumferentially adjacent, and wherein each individual lateral retaining clip is intended to cooperate with one of the dampers.

2. The device according to claim 1, wherein the flank has a first contact zone configured to cooperate with the plurality of upstream grooves.

3. The device according to claim 1, wherein each individual lateral retaining clip has a first end portion, which is free and which is configured to be able to be inserted respectively into a lateral recess of each damper.

4. The device according to claim 3, wherein the first end portion has a second zone of contact with the damper.

5. The device according to claim 3, wherein the first end portion is connected to a second end portion of the individual lateral retaining clip, and the second end portion is attached to the flank.

6. The device according to claim 5, wherein the first end portion is thicker than the second end portion.

7. The device according to claim 5, wherein the second end portion and the flank delimit a slot allowing the inter-blade ring sector to be mounted in the upstream groove.

8. The according to claim 1, wherein the individual lateral retaining clips are prestressed upwardly relative to the inter-blade ring sector.

9. The device according to claim 1, wherein the plurality of individual lateral retaining clips is distributed over a circumferential angular range which is greater than or equal to 10° and less than or equal to 30°.

10. A method for disassembling a wheel having blades of a turbine engine, the method comprising:

during a first step, disposing the wheel having blades around a vertical axis with an upstream side of the wheel turned upward, the blades of the wheel extending radially and being mounted circumferentially around a disk of the wheel, the wheel including, for each blade, a damper disposed in a cavity, which opens radially inward and which is delimited by a platform of the blade and by an inner upstream wall of the blade terminating by an upstream groove, the downstream retaining ring being housed in a downstream groove of the platform of the blade, the upstream groove and the downstream groove extending radially, during a second step after the first step, withdrawing the disk, during a third step after the second step, mounting the flank of the retaining device as claimed in claim 1 coaxially with the vertical axis in the plurality of upstream grooves being circumferentially adjacent and mounting the plurality of individual lateral retaining clips of the retaining device against the plurality of the dampers to retain the plurality of the dampers, during a fourth step after the third step, withdrawing the downstream retaining ring, during a fifth step after the fourth step, mounting a new downstream retaining ring in the downstream groove, during a sixth step after the fifth step, replacing the disk against the new downstream retaining ring in the wheel having blades.

11. A retaining device for disassembling a wheel having blades of a turbine engine in order to remove a downstream retaining ring of the wheel when the wheel is disposed around a vertical axis with an upstream side of the wheel turned upward, the blades of the wheel extending radially and being intended to be mounted circumferentially around a disk of the wheel, the wheel comprising, for each blade, a moldable damper disposed in a cavity which opens radially inward and which is delimited by a platform of the blade and by an inner upstream wall of the blade terminating by an upstream groove, the downstream retaining ring being housed in a downstream groove of the platform of the blade, the upstream groove and the downstream groove extending radially, wherein the retaining device is intended to be mounted coaxially with a vertical axis and comprises:

an inter-blade ring sector extending circumferentially and comprising a flank extending radially, and a plurality of individual lateral retaining clips, which have a prescribed spacing from one another and which are attached axially downstream of the inter-blade ring sector, wherein the individual lateral retaining clips form tabs protruding radially outward axially downstream of the inter-blade ring sector, wherein the flank is axially facing the individual lateral retaining clips, wherein the inter-blade ring sector is configured so that the flank is can be inserted into a plurality of upstream grooves being circumferentially adjacent, and wherein each individual lateral retaining clip is intended to cooperate with one of the moldable damper.

\* \* \* \* \*